US012562521B2

(12) United States Patent
Lager

(10) Patent No.: US 12,562,521 B2
(45) Date of Patent: Feb. 24, 2026

(54) OUTLET SAFETY COVER

(71) Applicant: Bengt Lager, Kennesaw, GA (US)

(72) Inventor: Bengt Lager, Kennesaw, GA (US)

(73) Assignee: CARDINAL GATES, INC., Newnan, GA (US)

( * ) Notice: Subject to any disclaimer, the term of this patent is extended or adjusted under 35 U.S.C. 154(b) by 153 days.

(21) Appl. No.: 18/372,385

(22) Filed: Sep. 25, 2023

(65) Prior Publication Data

US 2024/0106152 A1 Mar. 28, 2024

Related U.S. Application Data

(60) Provisional application No. 63/409,336, filed on Sep. 23, 2022.

(51) Int. Cl.
*H01R 13/447* (2006.01)
*H01R 13/635* (2006.01)

(52) U.S. Cl.
CPC ......... *H01R 13/447* (2013.01); *H01R 13/635* (2013.01)

(58) Field of Classification Search
CPC ............ H02G 3/14; H02G 3/08; H02G 3/081; H01H 13/04; H01H 2009/0292; H01H 9/22; H01H 9/02; H01R 13/46; H01R 13/453; H01R 25/00; H01R 25/006; H01R 25/003; H01R 13/447; H01R 13/6395
USPC ...... 174/66, 67, 50, 53, 57, 58; 220/3.2–3.9, 220/4.02, 241, 242; 439/535, 536
See application file for complete search history.

(56) References Cited

U.S. PATENT DOCUMENTS

| | | | | |
|---|---|---|---|---|
| 2,510,745 A * | 6/1950 | Kilgore | H01R 13/447 | 174/67 |
| 2,526,606 A * | 10/1950 | Gregg | H01R 13/447 | 174/67 |
| 3,491,327 A * | 1/1970 | Tait et al. | H01R 13/6395 | 174/67 |
| 4,603,932 A * | 8/1986 | Heverly | H01R 13/44 | 174/67 |
| 4,851,612 A * | 7/1989 | Peckham | H01R 13/6395 | 174/67 |
| 4,950,842 A * | 8/1990 | Menninga | H01R 13/447 | 174/67 |
| 5,195,901 A * | 3/1993 | Correnti | H01R 13/447 | 174/67 |

(Continued)

*Primary Examiner* — Angel R Estrada
(74) *Attorney, Agent, or Firm* — Thomas | Horstemeyer, LLP

(57) ABSTRACT

Various examples are provided related to outlet safety covers. In one example, a safety cover for an electrical outlet includes a mounting plate and an access cover comprising an outer face and four side panels. The mounting plate has a substantially rectangular edge including a first mounting groove extending in a first side of the edge and second and third mounting grooves in a second side of the edge opposite the first side. The four side panels include a first side panel including a first cover engagement tab extending and the second side panel including a disengagement opening and second and third cover engagement tabs on opposite sides of the disengagement opening. The access cover can be secured to the mounting plate and can be released from the mounting plate by flexing the second side panel disengaging at least one of the second and third cover engagement tabs.

19 Claims, 10 Drawing Sheets

(56) References Cited

U.S. PATENT DOCUMENTS

| | | | | | |
|---|---|---|---|---|---|
| 5,243,135 | A * | 9/1993 | Shotey | H02G 3/14 | 174/67 |
| 5,382,755 | A * | 1/1995 | Correnti | H01R 13/447 | 174/67 |
| 5,989,052 | A * | 11/1999 | Fields | H02G 3/14 | 439/373 |
| 7,179,996 | B1 * | 2/2007 | Britt | H01R 13/447 | 174/67 |
| 8,115,100 | B2 * | 2/2012 | Peckham | H01R 24/76 | 174/67 |
| 8,193,447 | B2 * | 6/2012 | Peckham | H01R 13/447 | 174/67 |
| 8,251,253 | B1 * | 8/2012 | Cleghorn | H02G 3/14 | 174/67 |
| 11,594,867 | B2 * | 2/2023 | Shentu | H02G 3/081 | |

* cited by examiner

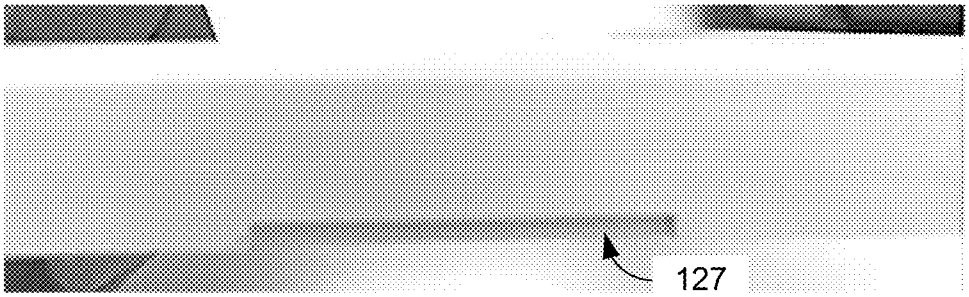
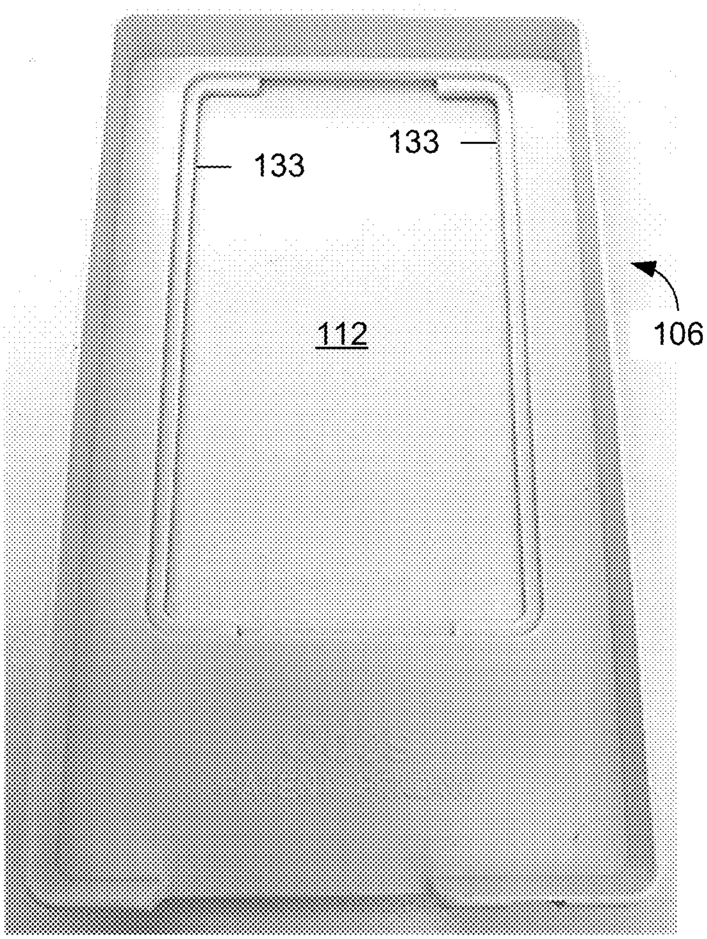
FIG. 2C
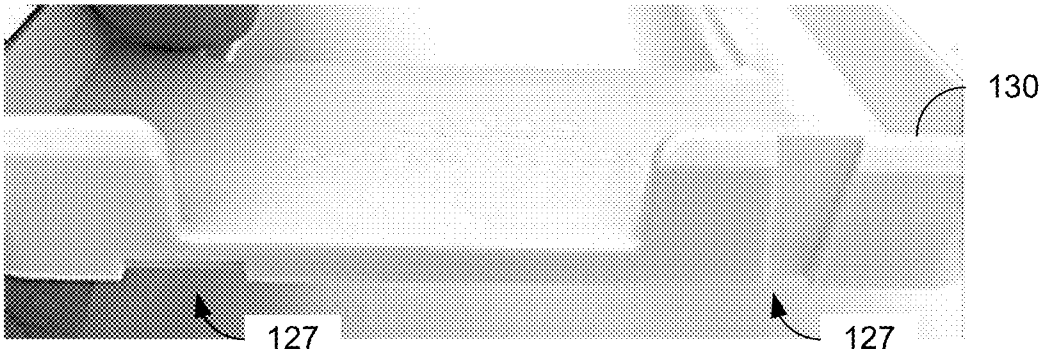

OUTLET SAFETY COVER

CROSS REFERENCE TO RELATED APPLICATIONS

This application claims priority to, and the benefit of, co-pending U.S. provisional application entitled "Outlet Safety Cover" having Ser. No. 63/409,336, filed Sep. 23, 2022, which is hereby incorporated by reference in its entirety.

BACKGROUND

Cords plugged into electrical outlets are unsightly and are an unsafe, unattractive nuisance. The use of adapters for charging devices further complicates the situation. Homes and commercial buildings have many more electrical outlets than are needed at any one time because current building codes in the United States require that spacing be no longer than six feet between available electrical outlets. Consequently, contemporary homes and commercial buildings and older homes and commercial buildings that are remodeled and meet current building codes have many excess electrical outlets. The cords and adapters plugged into the electrical outlets distract from the decor of a room and provide increased opportunities for the occupants of a room to come in contact with electrical hazards.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIGS. 2A-2E are images showing an example of a fabricated outlet safety cover, in accordance with various embodiments of the present disclosure.

DETAILED DESCRIPTION

Figure 1A:
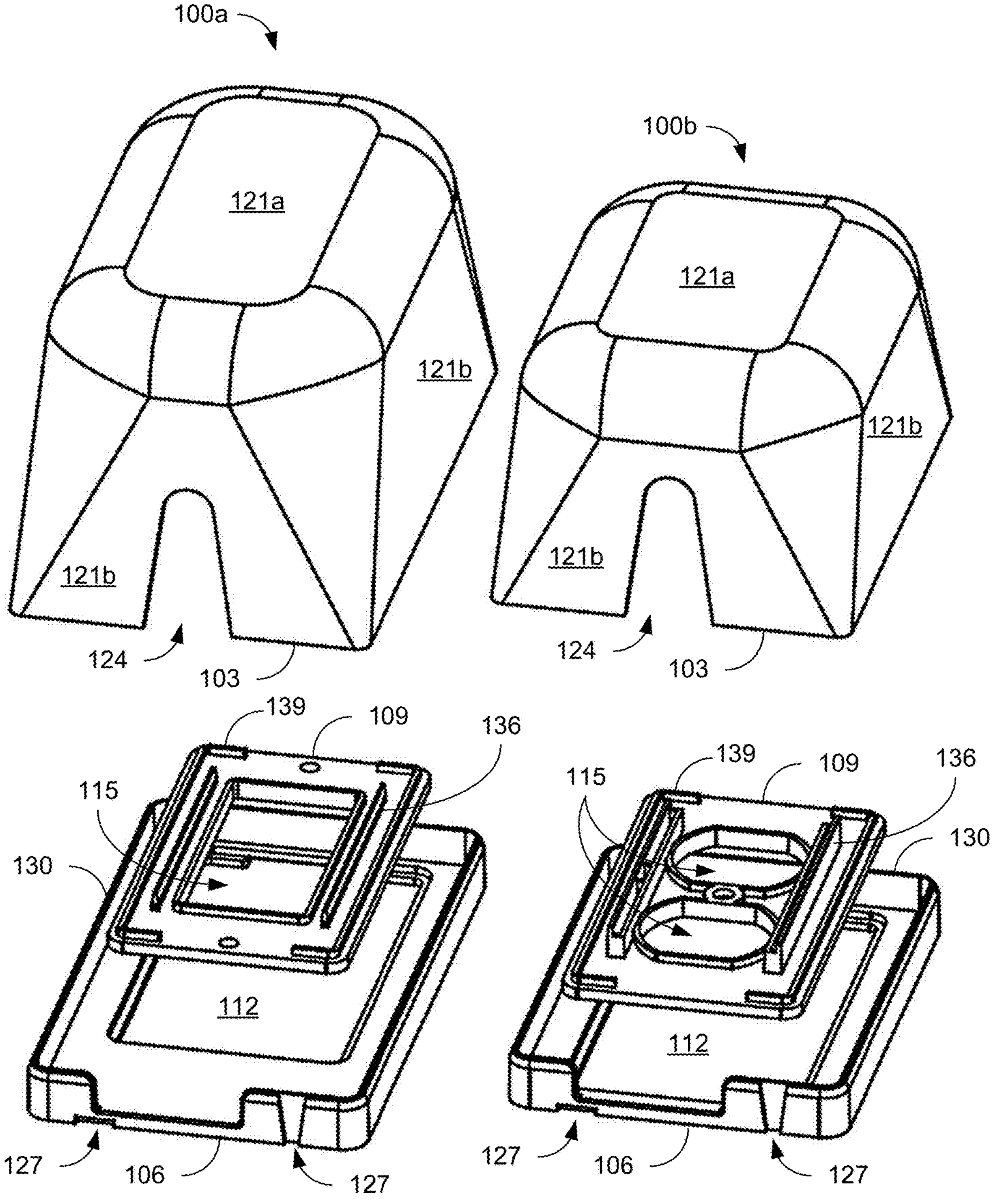
FIGS. 1A-1C illustrate examples of outlet safety covers, in accordance with various embodiments of the present disclosure.

Disclosed herein are various embodiments of methods related to outlet safety covers. Reference will now be made in detail to the description of the embodiments as illustrated in the drawings, wherein like reference numbers indicate like parts throughout the several views.

Electrical outlets are typically placed throughout a home or business for ready access to electrical power, and the electrical outlets are usually covered with a conventional wall plate. Many times, these electrical outlets are positioned where children can easily reach them. A child may insert an electrically conductive object or a finger into such an electrical outlet, resulting in an electric shock. This disclosure presents an electrical outlet safety cover that is safe, removable, and able to fit cords and adapters in multiple outlet configurations. The outlet safety cover can be used to cover outlets in older homes that may not be up to today's electrical codes, thus improving the safety of the home. The electrical outlet safety cover can also prevent children or pets from accessing any part of the wall outlet or the cords or adapters plugged into the outlet.

Figure 1B:
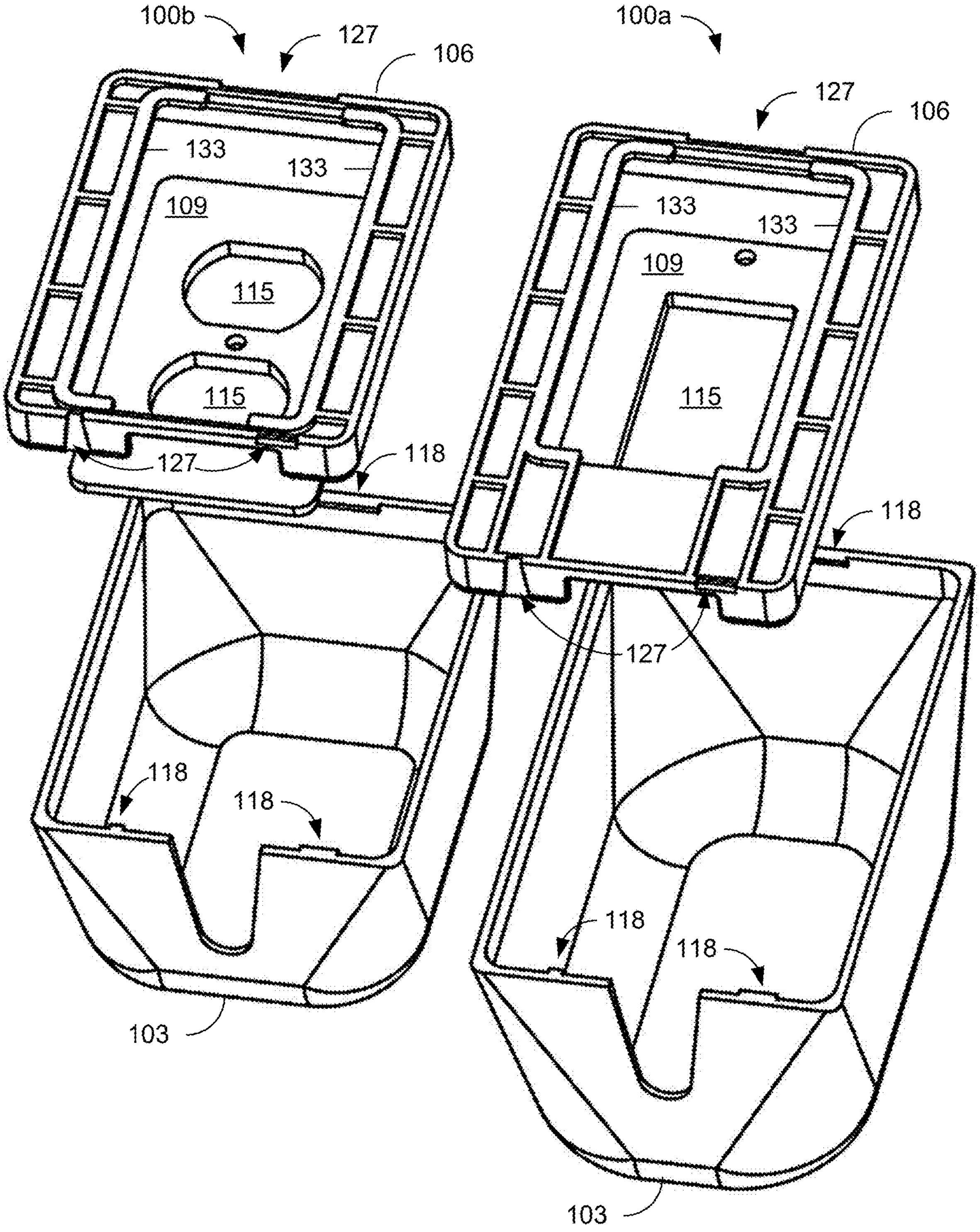
Figure 1C:
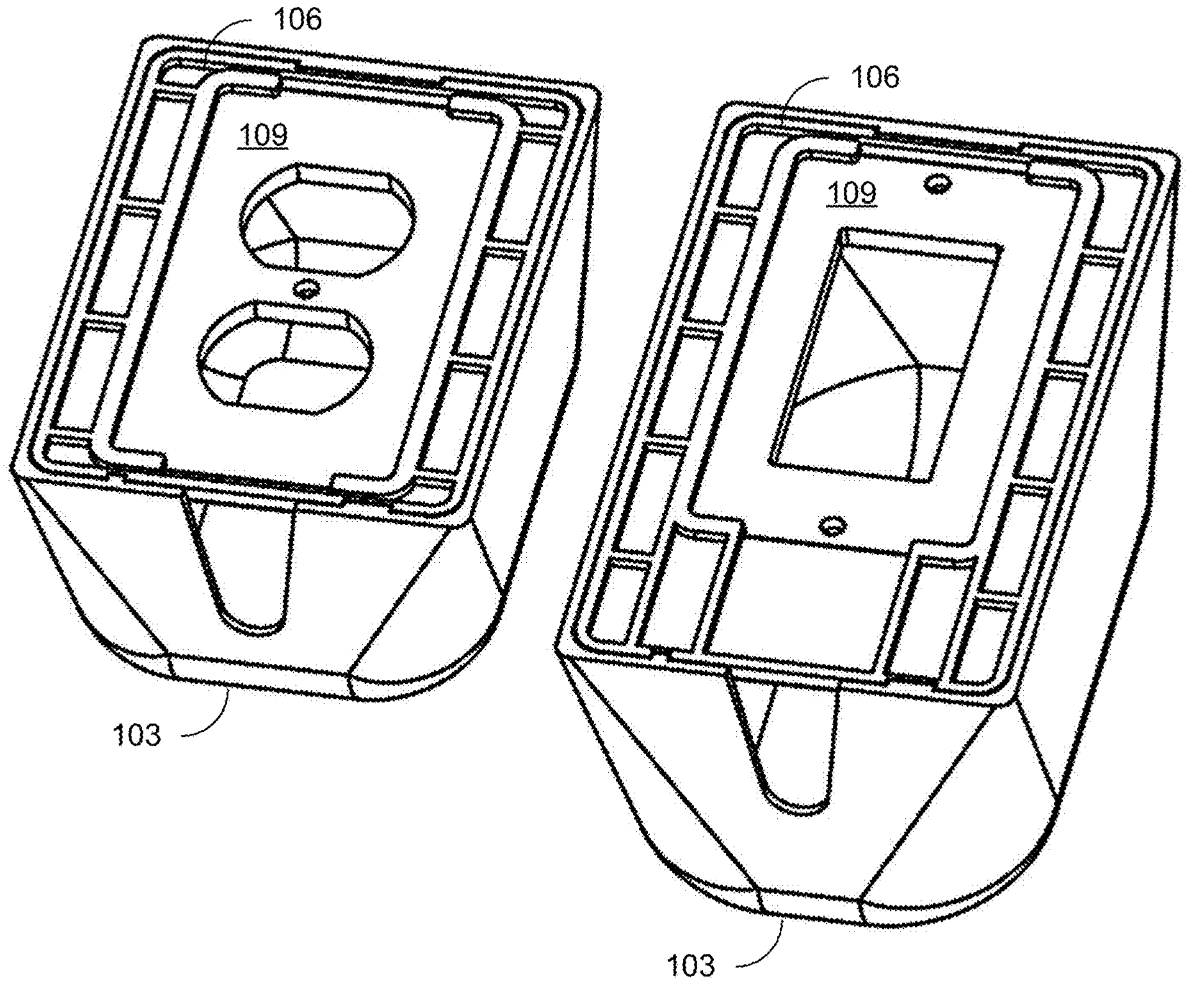

Referring now to FIGS. 1A-1C, examples of long and short versions of an outlet safety cover 100*a* and 100*b* as illustrated. The longer version (left) of the outlet safety cover 100*a* allows for stiffer cords that exhibit larger radiuses of curvature when plugged into the outlet and larger charging adapters that extend over the electrical outlet and the short version (right) of the outlet safety cover 100*b* allows for more flexible cords that exhibit smaller radiuses of curvature and smaller charging adapters. FIGS. 1A and 1B are exploded views illustrating the components of the outlet safety covers 100*a* and 100*b* from opposite sides, and FIG. 1C is an assembled view of the outlet safety covers 100*a* and 100*b*. The outlet safety covers 100 include an access cover 103 and a mounting plate 106. The mounting plate 106 can include an outlet plate 109 configured to engage with a central opening 112 of the mounting plate 106. The outlet plate 109 can comprise one or more outlet (or plug) opening 115 sized and spaced to engage with an electrical outlet (e.g., conventional and GFCI outlets). Design of the outlet openings 115 of the two types of outlets are different. While illustrated with outlet openings 115 configured to align with a single pair of plugs in GFCI outlet design (left) or a conventional outlet design (right), the outlet plate 109 (and mounting plate 106) can be configured to align with multiple pairs of outlet openings 115 for alignment with multiple electrical outlets arranged in a common mounting.

The access cover 103 comprises an outer face 121*a* and four side panels 121*b* surrounding the outer face 121*a*. Transitions between the outer face 121*a* and the side panels 121*b* can be at a fixed angle, tapered, stepped, or as shown in the examples of FIG. 1A, can be rounded. Similarly, transitions between the side panels 121*b* can be at a fixed angle, tapered, stepped, or as shown in the examples of FIG. 1A, can be rounded. One or more of the side panel 121*b* can include one or more cover engagement tab 118 extending along and adjacent to a side (or edge) of the side panel 121*b*. The engagement tabs 118 can facilitate coupling of the access cover 103 with the mounting plate 106. Alternatively, one or more of the side panel 121*b* can include one or more engagement groove (or recess) extending along and adjacent to a side (or edge) of the side panel 121*b*, or can include a combination of engagement tabs and engagement grooves, to facilitate coupling.

The access cover 103 includes a disengagement opening 124 that allows for the cords or charging cables connected to adapters plugged into the outlet to exit the access cover 103 and to facilitate disengagement of the access cover 103 from the mounting plate 106, as will be described. As can be seen in the example of FIG. 1B, the access cover 103 can include a first engagement tab 118 on the side panel 121*b* opposite the disengagement opening 124 and second and third engagement tabs 118 on the side panel 121*b* including the disengagement opening 124. The second and third engagement tabs 118 are on opposite sides of the disengagement opening 124.

The mounting plate 106 is substantially planar with a face on a first side and a mounting surface on a second side opposite the face. The mounting plate 106 comprises a substantially rectangular edge comprising one or more mounting groove 127 (or mounting tab) that correspond to the cover engagement tabs 118 (or engagement grooves) of the access cover 103. In the example of FIGS. 1A and 1B, the edge of the mounting plate 106 includes a first mounting groove 127 on a first side of the edge as shown in FIG. 1B, and second and third mounting grooves 127 on a second side of the edge. In addition, the mounting plate 106 can include an engagement ridge 130 that extends about at least a portion of the edge. The engagement ridge 130 can provide additional rigidity to the mounting plate 106 and can facilitate alignment of the access cover 103 over the mounting plate 106. The mounting surface of the mounting plate 106 can also include ridges as shown in FIG. 1B to increase the strength and rigidity of the mounting plate 106.

As shown in the example of FIG. 1A, the engagement ridge 130 extends across three sides of the substantially rectangular edge (including the first side with the first mounting groove 127) and across a portion of the other side of the edge (the second side with the second and third mounting grooves 127) that is adjacent to the disengagement opening 124 when the access cover 103 is secured to the mounting plate 106. This reduces restriction of cords or cables that pass through the disengagement opening 124 during use and allows for user access to disengage the access cover 103 from the mounting plate 106. The access cover 103 can include a recess extending around the open side of the side panels to align with the engagement ridge 130. For example, the recess can be a shallow depression with a surface that aligns with the outer surface of the engagement ridge 130 and extends around the top of the engagement ridge 130.

As illustrated in FIG. 1B, the first mounting groove 127 extends across a portion of the first side adjacent to the mounting surface of the mounting plate 106. As can be seen in FIGS. 1A and 1B, one of the second and third mounting grooves 127 extends across a portion of the first side adjacent to the mounting surface and the other extends from the mounting surface of the mounting plate 106 across a surface (and over the height) of the engagement ridge 130. The width of this mounting groove 127 can vary across the height of the engagement ridge 130, starting with a larger width at the top of the engagement ridge 130 and narrowing towards the mounting surface of the mounting plate 106. This tapering can facilitate alignment of the access cover 103 over the engagement ridge 130 by guiding the corresponding cover engagement tab 118. The access cover 106 is secured to the mounting plate 106 by engaging the cover engagement tabs 188 with the corresponding mounting grooves 127. The access cover 103 can be released from the mounting plate 106 by applying pressure to the inside surface of the access cover 103 adjacent to the disengagement opening 124. A user can reach through the disengagement opening 124 with a finger and pull on one side to flex the side panel 121*b* and disengage the cover engagement tab 118 (or engagement groove) from the corresponding mounting groove 127 (or mounting tab) of the mounting plate 106. The thickness of the side panel 121*b* can be varied to allow flexing of the side panel and disengagement of the cover engagement tab 118 (or engagement groove) while maintaining cover strength.

The central opening 112 of the mounting plate 106 can include a mounting shoulder 133 on a side opposite the face and adjacent to the mounting surface. The mounting shoulder 133 can extend around at least a portion of the central opening 112. As illustrated in FIG. 1B, the mounting shoulders 133 extends across opposite sides of the central opening 112. In other embodiments, the mounting shoulders 133 can extend around the central opening 112. The outlet plate 109 engages with the mounting shoulder 112 when positioned within the central opening 112 allowing the mounting plate 106 to be attached to the electrical outlet using a fastener or other appropriate connector. For example, one or more screws can extend through openings in the outlet plate 109 to detachably attached the mounting plate 106 to the electrical outlet.

The mounting shoulder 133 engages with the outlet plate 109 when positioned within the central opening 112 to secure the mounting plate 106 in position about the electrical outlet. As can be seen in FIGS. 1A and 1B, the outlet plate 109 can comprise one or more opening 115 allowing access to plug openings in an electrical outlet. The opening(s) 115 can be configured to engage with a conventional outlet or a GFCI outlet. The outlet plate 109 can be secured to the electrical outlet by one or more fastener extending through one or more corresponding opening in the outlet plate 109. The outlet plate 109 can include a flat surface and an opposite surface including ridges 136 extending along at least a portion of the outlet plate 109 to provide additional strength and/or rigidity to the outlet plate 109. The ridges 136 can extend on opposite sides of the one or more opening 115 allowing access to the contact openings in the electrical outlet as can be seen in FIG. 1A. The ridges 136 can include a single linear ridge or two (or more) linear ridges in parallel as are illustrated in the examples of FIG. 1A. The outlet plate 109 can be positioned in the central opening 112 with the ridges on a side opposite the mounting shoulder(s) 133 as shown in FIG. 1C or with the ridges aligned between the mounting shoulder(s) 133 (and the flat surface facing outward and exposed). The outlet plate 109 can also include one or more ridges 139 adjacent to an edge of the outlet plate that align with the mounting shoulder(s) 133 when the outlet plate 109 is positioned within the central opening 112.

Figure 2A:
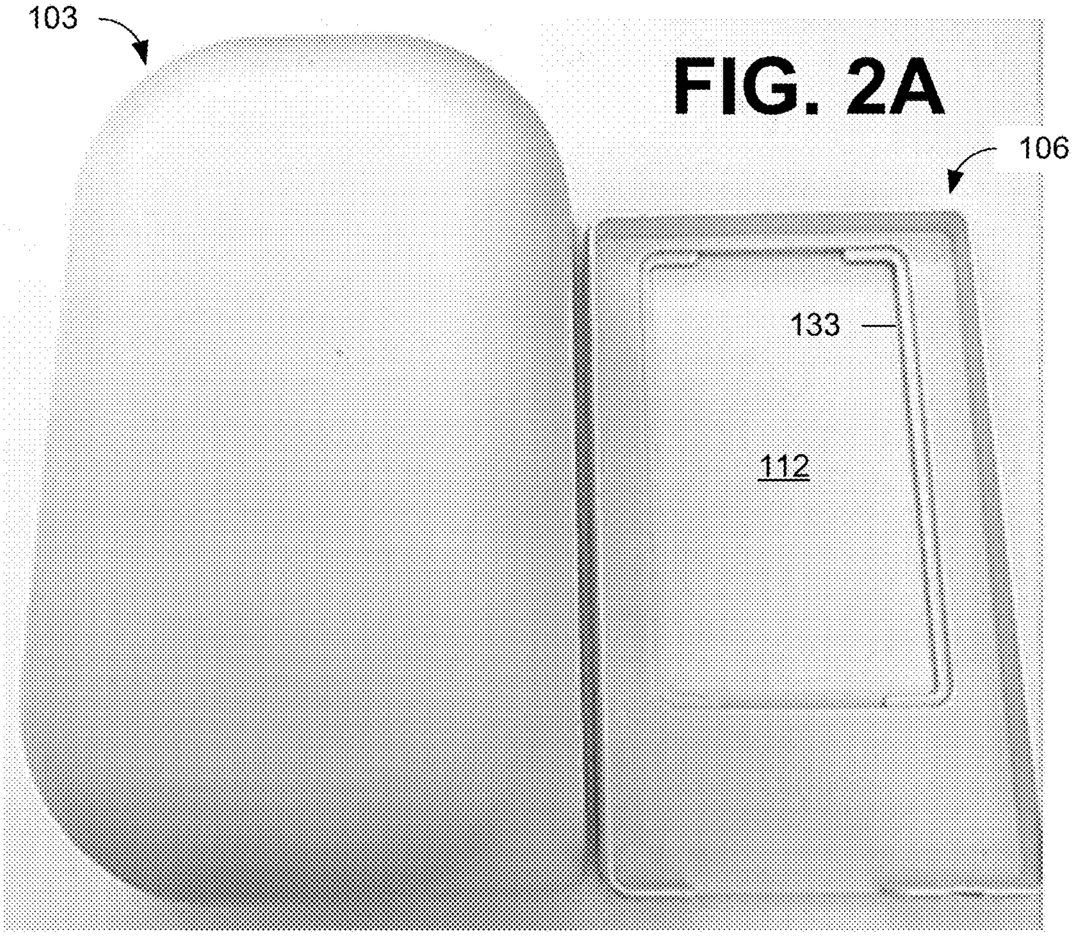
Figure 2B:
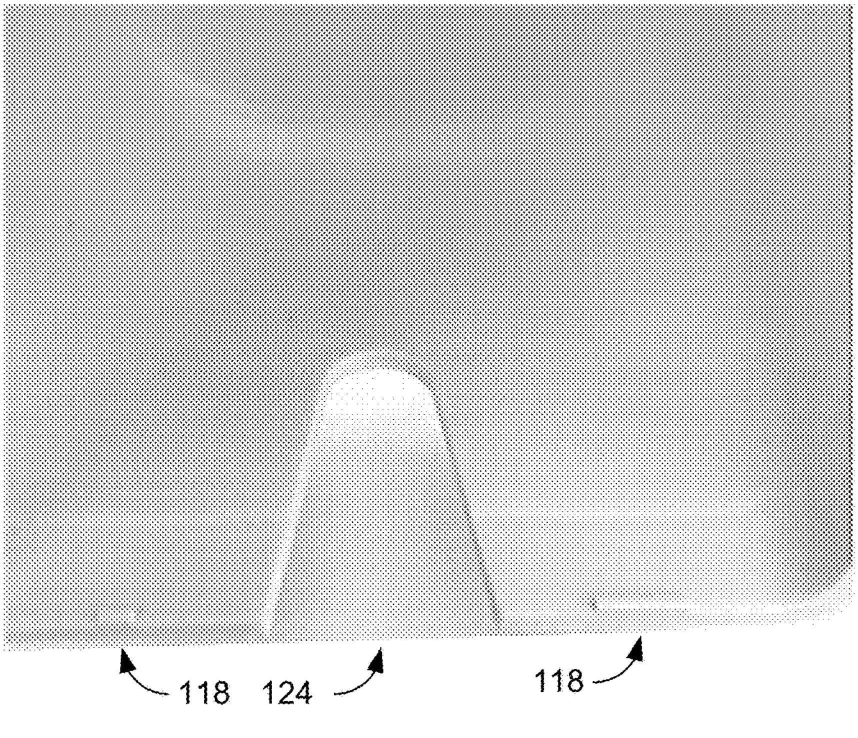
Figure 2D:
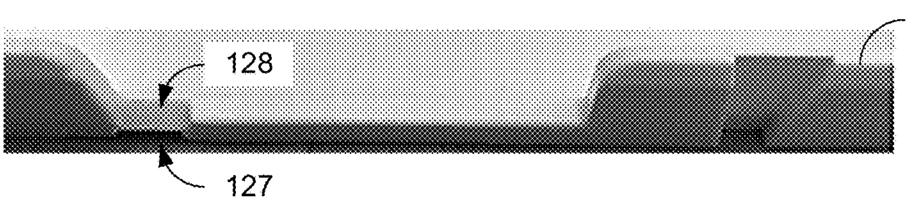

FIGS. 2A-2E are images of a fabricated outlet safety cover 100*a* as described. FIG. 2A shows the access cover 103 with rounded edges and the mounting plate 106 without the outlet plate 109 in the central opening 112. The mounting shoulder 133 can be seen extending inward from the edge of the central opening 112. The surface of the access cover 103 can be textured or smooth. The surface of the access cover 103 can be designed to allow for painting to match the wall color when mounted to an electrical outlet. FIG. 2B shows the inside of the access cover 103 on the side including the disengagement opening 124 and cover engagement tabs 118 on both sides of the disengagement opening 124. The shallow recess configured to align with the engagement ridge 130 is also visible. FIG. 2C shows images of the sides of the mounting cover 106 that include the mounting grooves 127. The top image shows the first mounting groove 127 extending across a portion of the first side adjacent to the mounting surface and the bottom image shows the second and third mounting grooves 127 on the second side opposite the first side. One mounting groove 127 extends across a portion of the side adjacent to the mounting surface and the other mounting groove 127 extends across the height of the engagement ridge 130 as discussed. In some cases, the engagement ridge 130 can include a tapered portion 128 sloping from an inner side to an outer side of the engagement ridge adjacent to second mounting groove 127 as shown in FIG. 2D. The tapered portion 128 can allow the corresponding cover engagement tab 118 to more easily slide over the engagement ride 130 and into the mounting groove 127 during installation of the access cover 103 on the mounting plate 106.

Figure 2E:
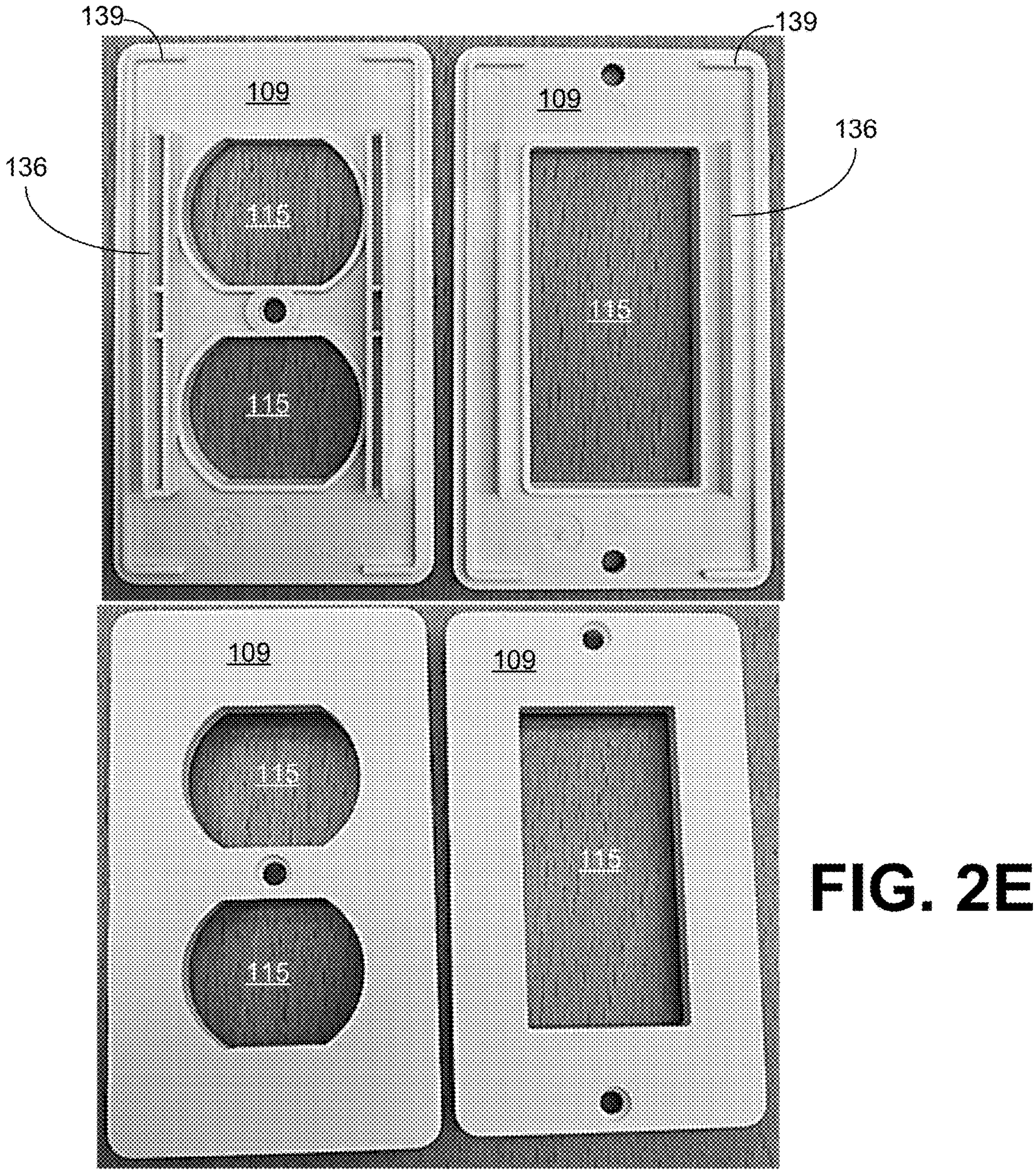

FIG. 2E includes images of outlet plates 109 configured to engage with a conventional outlet (left image) or a GFCI outlet (right image) including two linear ridges 136 in parallel (left image) or a single linear ridge 136 (right image) extending on opposite sides of the outlet opening(s) 115. The outlet plate 109 can also include two ridges 139 adjacent to an edge of the outlet plate 109 that align with the mounting shoulder 133 when the outlet plate 109 is positioned within the central opening 112.

Figure 3A:
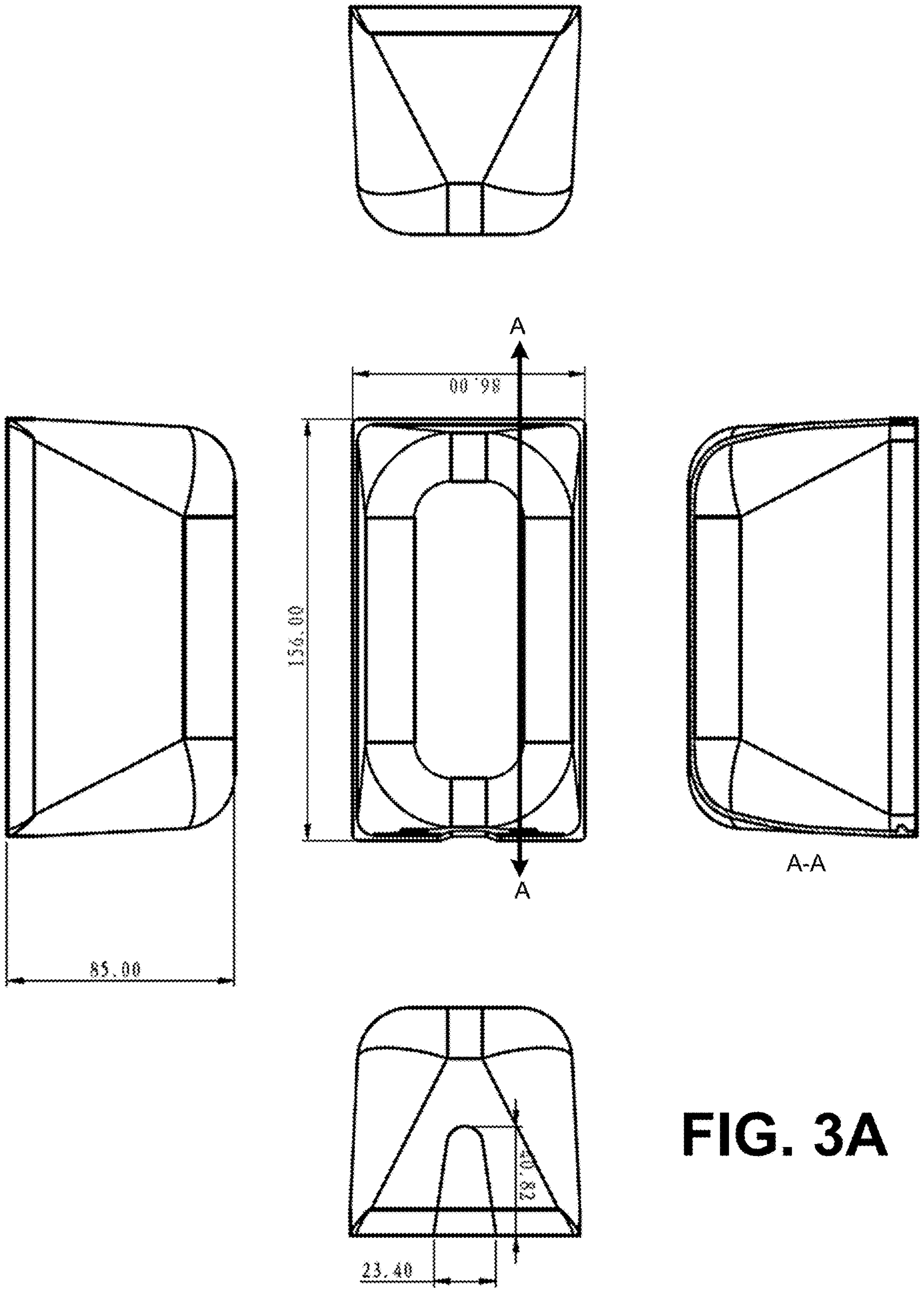
FIGS. 3A-3D illustrate examples of outlet safety covers, in accordance with various embodiments of the present disclosure.
Figure 3B:
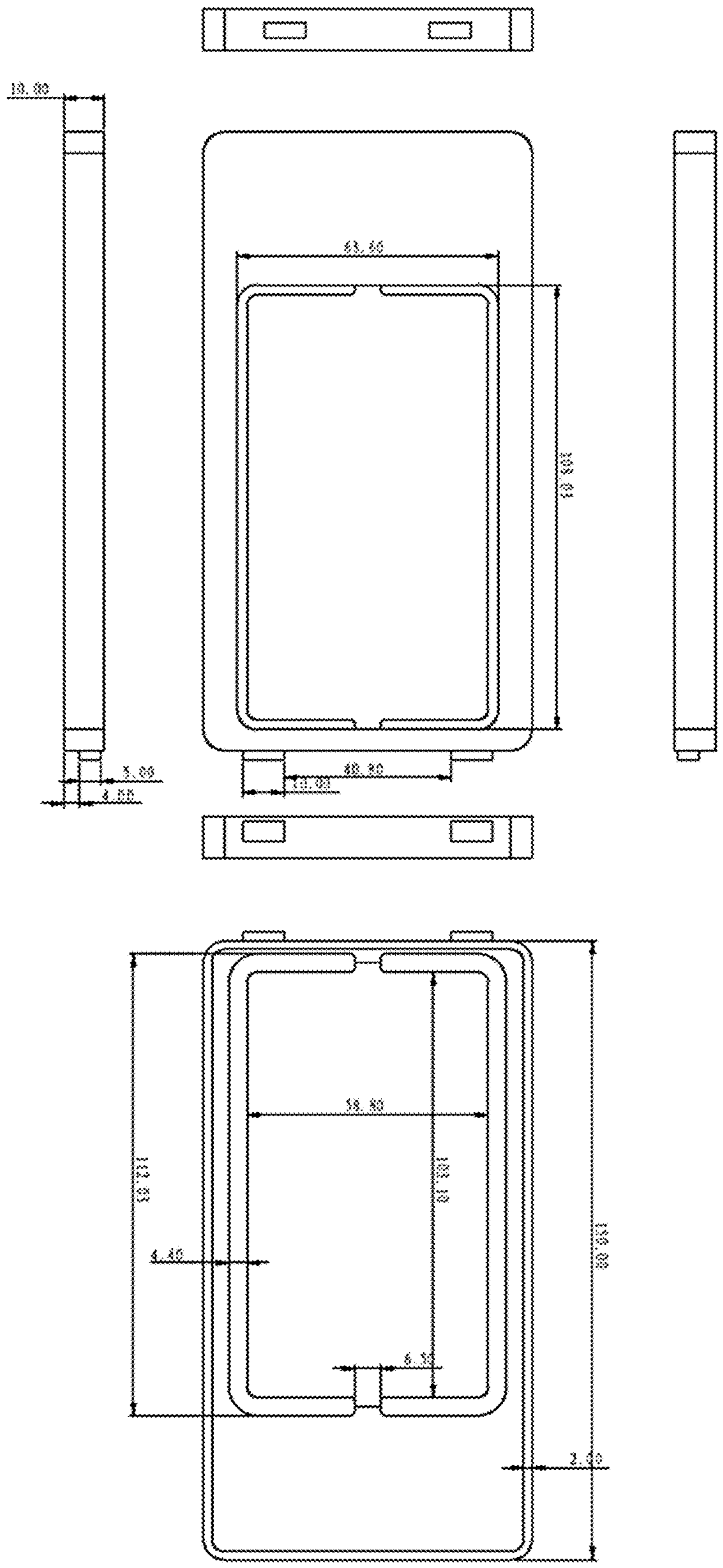
Figure 3C:
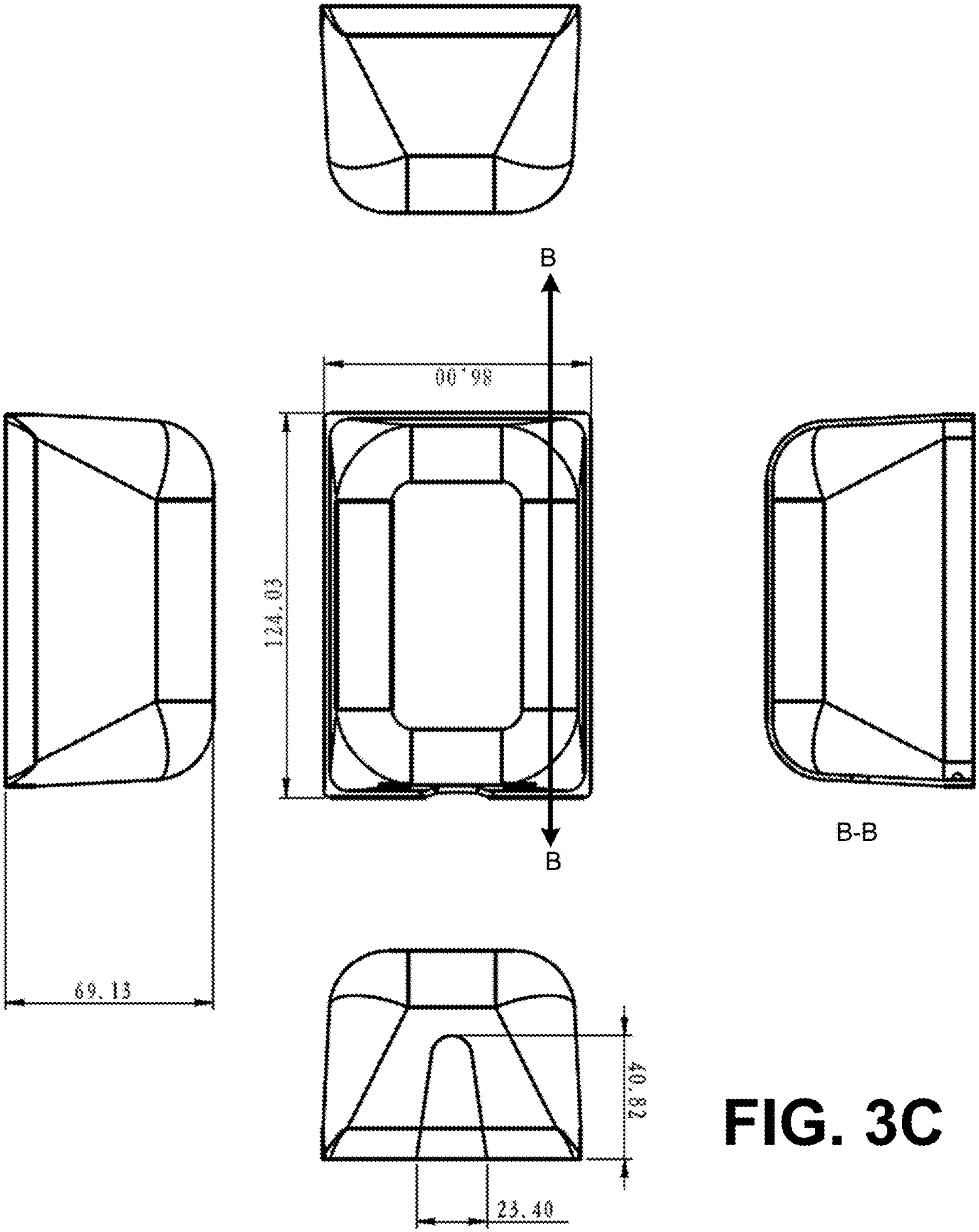
Figure 3D:
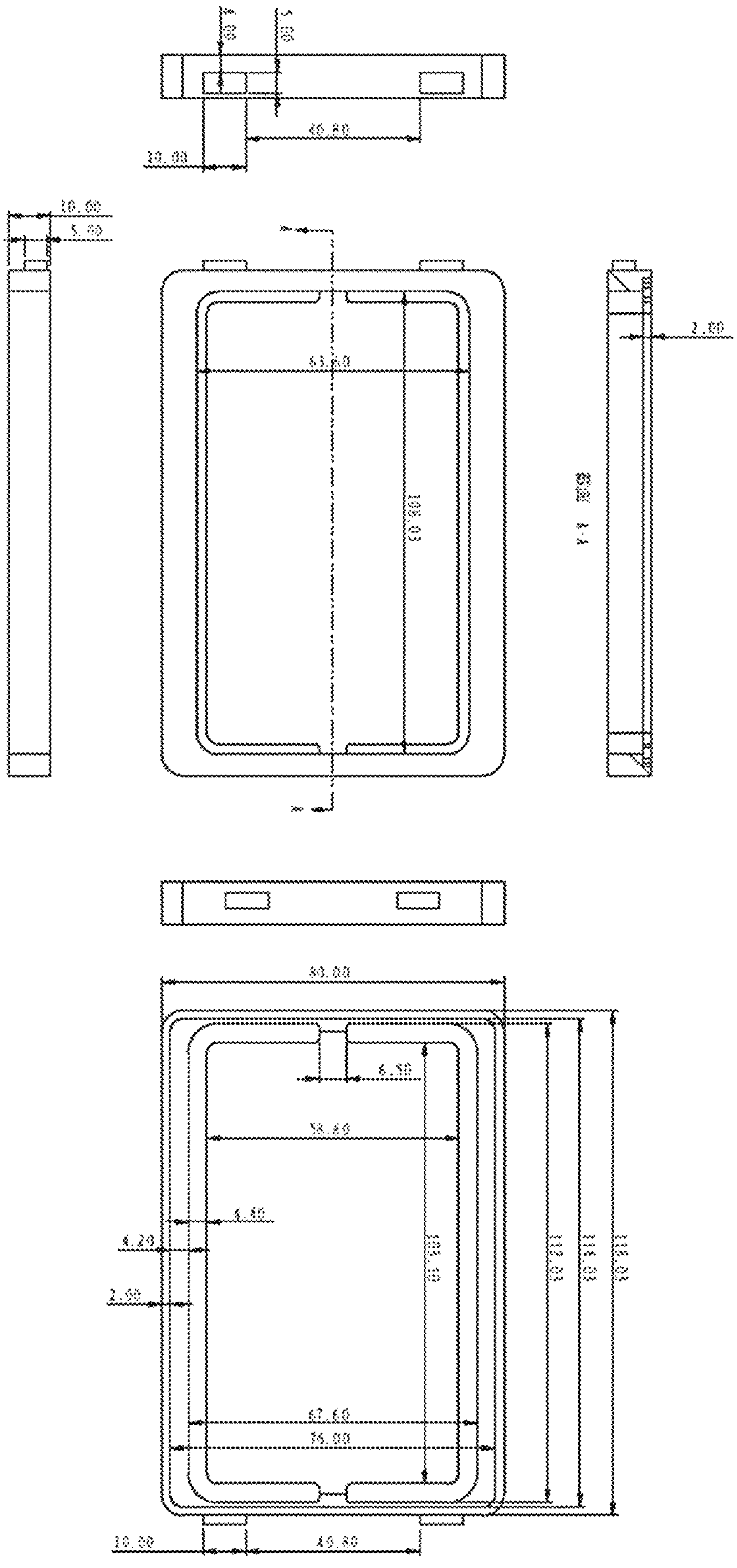

FIGS. 3A-3D illustrate examples of dimensions of the long version of the outlet safety cover 100*a* (FIGS. 3A-3B) and the short version of the outlet safety cover 100*b* (FIGS. 3C-3D). In the example of FIGS. 3A-3D, the access cover 103 includes a combination of engagement tabs and grooves and the mounting plate 106 includes a combination of corresponding mounting grooves and mounting tabs to secure the access cover 103 to the mounting plate 106.

The outlet safety cover is a sleek way to keep electrical plugs and adapters out of children's reach, and it also happens to look nice and blends in with your home interior. Compared to competitor products that block the second outlet, the unique off-center design accommodates large adapters up to 3 3/8" long while still leaving the second outlet available for another plug. The interior height is also bigger to allow bulky adapter blocks with USB cords that stick out up to 3 1/8". The hidden locking mechanism keeps children away while still allowing access to use the outlets. It's also paintable to blend in with your walls—simply paint the cover to match your wall color so the outlets are out of sight and out of mind.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A safety cover for an electrical outlet, comprising:

a mounting plate configured for mounting to the electrical outlet, the mounting plate having a substantially rectangular edge comprising a first mounting groove extending in a first side of the substantially rectangular edge and second and third mounting grooves in a second side of the substantially rectangular edge opposite the first side, wherein the mounting plate comprises a central opening sized and dimensioned to receive an outlet plate configured to attach to the electrical outlet, the central opening comprising a mounting shoulder on a side opposite a face of the mounting plate, wherein the mounting shoulder engages with the outlet plate when positioned within the central opening to secure the mounting plate in position about the electrical outlet; and an access cover comprising an outer face and four side panels located about the outer face, each side panel comprising a first side attached to the outer face, a second side opposite the first side, and third and fourth sides extending between the first and second sides and attached to two adjacent side panels, the four side panels comprising a first side panel and a second side panel opposite the first side panel, the first side panel comprising a first cover engagement tab extending along and adjacent to the second side, and the second side panel comprising a disengagement opening extending inward from the second side, and second and third cover engagement tabs extending along and adjacent to the second side on opposite sides of the disengagement opening, where the access cover is secured to the mounting plate by each cover engagement tab engaging with its corresponding mounting groove when the four side panels of the access cover are positioned over the mounting plate with the second sides of the four side panels surrounding the substantially rectangular edge of the mounting plate, and the access cover is released from the mounting plate by flexing of the second side of the second side panel disengaging at least one of the second and third cover engagement tabs from the mounting groove in response to pressure applied to an inner surface of the second side panel via the disengagement opening.

2. The safety cover of claim 1, wherein the mounting plate comprises an engagement ridge extending about at least a portion of the substantially rectangular edge, the engagement ridge extending outward from a face of the mounting plate.

3. The safety cover of claim 2, wherein the engagement ridge extends across three sides of the substantially rectangular edge and across a portion of the second side of the substantially rectangular edge.

4. The safety cover of claim 2, wherein at least one mounting groove of the second and third mounting grooves extend across a height of the engagement ridge.

5. The safety cover of claim 4, wherein a width of the at least one mounting groove varies across the height of the engagement ridge.

6. The safety cover of claim 2, wherein the engagement ridge is surrounded by the four side panels of the access cover when the access cover is secured to the mounting plate.

7. The safety cover of claim 1, wherein the outlet plate comprises one or more opening allowing access to plug openings in the electrical outlet.

8. The safety cover of claim 7, wherein the one or more opening is configured to engage with a conventional outlet or a GFCI outlet.

9. The safety cover of claim 7, wherein the outlet plate is secured to the electrical outlet by one or more fastener extending through one or more corresponding opening in the outlet plate.

10. The safety cover of claim 7, wherein the outlet plate comprises ridges extending along at least a portion of the outlet plate, the ridges extending on opposite sides of the one or more opening allowing access to the plug openings in the electrical outlet.

11. The safety cover of claim 1, wherein the outlet plate comprises one or more ridges adjacent to an edge of the outlet plate, the one or more ridges configured to align with the mounting shoulder when the outlet plate is positioned within the central opening.

12. The safety cover of claim 1, wherein the central opening is substantially centered in the mounting plate.

13. The safety cover of claim 1, wherein the central opening is offset from a center of the mounting plate away from the second side of the substantially rectangular edge.

14. The safety cover of claim 1, wherein corners of the substantially rectangular edge are rounded.

15. The safety cover of claim 1, wherein the disengagement opening is substantially centered in the second side of the second side panel.

16. The safety cover of claim 1, wherein lengths of the second and third cover engagement tabs are different.

17. The safety cover of claim 1, wherein the second side of each side panel is configured to align with an outer surface of the substantially rectangular edge of the mounting plate.

18. The safety cover of claim 17, wherein the second side of each side panel is configured to align with an outer surface of an engagement ridge extending about the substantially rectangular edge.

19. The safety cover of claim 18, wherein the access cover comprises a recess extending about the second side of the side panels, the recess configured to align with the engagement ridge.

* * * * *